(12) United States Patent
Warner

(10) Patent No.: US 9,883,049 B1
(45) Date of Patent: Jan. 30, 2018

(54) SYSTEM AND METHOD FOR CELL SITE PERFORMANCE MANAGEMENT

(71) Applicant: Sprint Communications Company L.P., Overland Park, KS (US)

(72) Inventor: Kevin D. Warner, Bucyrus, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 833 days.

(21) Appl. No.: 14/226,804

(22) Filed: Mar. 26, 2014

(51) Int. Cl.
*H04M 7/00* (2006.01)
*H04M 15/00* (2006.01)
*H04M 15/34* (2006.01)

(52) U.S. Cl.
CPC ........... *H04M 15/58* (2013.01); *H04M 15/34* (2013.01)

(58) Field of Classification Search
CPC ............ H04W 16/00; G06Q 30/0247; G06Q 30/0282; G06Q 40/06; H04M 7/0087; H04M 15/00; H04M 15/49; H04M 2215/78
USPC ..... 705/26.64, 400, 348, 30, 347, 306, 7.29, 705/7.38, 7.31
See application file for complete search history.

(56) References Cited

U.S. PATENT DOCUMENTS

| | | | |
|---|---|---|---|
| 5,854,903 A * | 12/1998 | Morrison | H04L 49/205 370/381 |
| 5,974,308 A * | 10/1999 | Vedel | H04M 15/00 379/130 |
| 6,112,101 A * | 8/2000 | Bhatia | H04W 72/10 455/450 |
| 6,999,943 B1 * | 2/2006 | Johnson | G06Q 20/10 705/35 |
| 7,801,523 B1 | 9/2010 | Kenderov | |
| 7,853,244 B1 * | 12/2010 | Brisebois | G06Q 30/0203 379/15.03 |
| 8,055,259 B1 | 11/2011 | Sigg et al. | |
| 8,228,870 B1 | 7/2012 | Sigg et al. | |
| 8,229,415 B1 | 7/2012 | Chen et al. | |

(Continued)

FOREIGN PATENT DOCUMENTS

| JP | 2009027355 A | 2/2009 |
|---|---|---|
| WO | 2008087251 A1 | 7/2008 |

OTHER PUBLICATIONS

FAIPP Pre-Interview Communication dated Apr. 15, 2016, U.S. Appl. No. 14/553,999, filed Nov. 25, 2014.

(Continued)

*Primary Examiner* — Charles Appiah
*Assistant Examiner* — Edward Zhang

(57) ABSTRACT

A server. The server comprises a processor, a memory, and an application that reads revenue data and usage data, wherein the usage data comprises cell site usage of each of a plurality of subscribers, and wherein the revenue data corresponds to each of the subscribers, analyzes the usage data for each subscriber to determine a set of cell sites used by the subscriber, associates a portion of the revenue data for each subscriber to the set of cell sites used by that subscriber, reads expense data for each of the plurality of cell sites, reads capital cost data for each of the plurality of cell sites, and determines a profitability metric value for each of the plurality of cell sites based on the portion of revenue data of each subscriber associated to the cell site, based on the site-specific expense data, and based on the site-specific capital cost data.

18 Claims, 8 Drawing Sheets

(56) References Cited

U.S. PATENT DOCUMENTS

| | | |
|---|---|---|
| 8,406,757 B1 | 3/2013 | Singh et al. |
| 8,494,518 B1 | 7/2013 | Shah et al. |
| 8,577,332 B1 | 11/2013 | Quint et al. |
| 9,118,780 B2* | 8/2015 | Hutchenson .......... G06Q 20/12 |
| 9,661,504 B1 | 5/2017 | Hagstrum et al. |
| 2005/0174995 A1* | 8/2005 | Tovinger ............. G06Q 40/025 370/352 |
| 2005/0197114 A1 | 9/2005 | Kent |
| 2005/0261003 A1 | 11/2005 | Fiedler et al. |
| 2006/0030291 A1 | 2/2006 | Dawson et al. |
| 2007/0167150 A1* | 7/2007 | Hutcheson .......... G06Q 20/102 455/405 |
| 2009/0063220 A1* | 3/2009 | Raufaste ............ G06Q 10/02 705/5 |
| 2010/0214957 A1* | 8/2010 | De Carvalho Resende .............. H04L 41/0806 370/255 |
| 2010/0229205 A1* | 9/2010 | Hakusui ................ H04H 20/72 725/62 |
| 2015/0039755 A1 | 2/2015 | Kane et al. |

OTHER PUBLICATIONS

Hagstrum, William Troy, et al., "Use of Customer Impact to Prioritize Network Efforts," filed Nov. 25, 2014, U.S. Appl. No. 14/553,999.

Pierce, Matthew, Patent Application entitled "Providing Personalized Offers to a Wireless Device Based on Historical Usage and Network Coverage Data", filed Feb. 17, 2015, U.S. Appl. No. 13/399,487.

Notice of Allowance dated Jul. 22, 2011, U.S. Appl. No. 12/395,025 filed Feb. 27, 2009.

Notice of Allowance dated Jan. 19, 2017, U.S. Appl. No. 14/553,999, filed Nov. 25, 2014.

* cited by examiner

SYSTEM AND METHOD FOR CELL SITE PERFORMANCE MANAGEMENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication is the provision of voice, data, and other wireless services to portable electronic devices that may move about freely rather than stay fixed in a single location. Mobile devices may connect wirelessly to land-based cellular networks of base transceiver stations that link to a public switched telephone network to allow other telephones to be dialed. Mobile devices send and receive radio signals with any number of cell site base transceiver stations. These cell sites may be mounted on towers, poles or buildings, located throughout populated, rural, and/or remote areas, and then connected to a cabled (e.g., a landline') communication network and switching system.

SUMMARY

In an embodiment, a server for tracking cell site economics is disclosed. The server comprises a processor, a memory, and an application stored in the memory, that when executed by the processor, reads revenue data and usage data from a data store, wherein the usage data comprises data about cell site usage of each of a plurality of wireless communication service subscribers, and wherein the revenue data comprises data about revenue obtained by a wireless communication service provider from each of the wireless communication service subscribers, analyzes the usage data for each subscriber to determine a set of cell sites most used by the subscriber, wherein the set of most used cell sites is a predefined number of cell sites and is identified from among a plurality of cell sites operated by the wireless communication service provider, associates a portion of the revenue data for each subscriber to the set of cell sites most used by that subscriber, reads expense data for each of the plurality of cell sites from a data store, wherein the expense data represents the expense of operating the cell site, reads capital cost data for each of the plurality of cell sites from a data store, wherein the capital cost data represents the capital cost associated with the cell site, determines a return on invested capital (ROIC) value for each of the plurality of cell sites based on the portion of revenue data of each subscriber associated to the cell site, based on the expense data associated to the cell site, and based on the capital cost data associated to the cell site, and stores the return on invested capital (ROIC) value for each cell site in a data store comprising cell site information, wherein the data store comprising cell site information is accessible to users associated with a plurality of workstations.

In an embodiment, a method of assessing metrics associated with cell sites to evaluate profitability is disclosed. The method comprises reading revenue data and usage data from a data store, wherein the usage data comprises data about cell site usage of each of a plurality of wireless communication service subscribers, and wherein the revenue data comprises data about revenue obtained by a wireless communication service provider from each of the wireless communication service subscribers, analyzing the usage data for each subscriber to determine a set of cell sites most used by the subscriber, wherein the set of most used cell sites is a predefined number of cell sites and is identified from among a plurality of cell sites operated by the wireless communication service provider, associating a portion of the revenue data for each subscriber to the set of cell sites most used by that subscriber, reading expense data for each of the plurality of cell sites from a data store, wherein the expense data represents the expense of operating the cell site, reading capital cost data for each of the plurality of cell sites from a data store, wherein the capital cost data represents the capital cost associated with the cell site, determining a return on invested capital (ROIC) value for each of the plurality of cell sites based on the portion of revenue data of each subscriber associated to the cell site, based on the expense data associated to the cell site, and based on the capital cost data associated to the cell site, storing the return on invested capital (ROIC) value for each cell site in a data store comprising cell site information, wherein the data store comprising cell site information is accessible to users associated with a plurality of workstations, accessing the data store comprising cell site information to retrieve the ROIC value for each of the plurality of cell sites, identifying cell sites with ROIC values above a predefined threshold, wherein the identified cell sites with ROIC values above the predefined threshold are classified as profitable cell sites, classifying cell sites with ROIC values below the predefined threshold as unprofitable cell sites, determining the metrics corresponding to the profitable cell sites and the metrics corresponding to the unprofitable cell sites, wherein the metrics comprise subscriber details, locations, and markets associated with the cell sites, comparing the metrics corresponding to the profitable cell sites with the metrics corresponding to the unprofitable cell sites, wherein differences among the profitable cell sites are identified, determining changes to be implemented at the unprofitable cell sites to optimize metrics and increase ROIC values, compiling information obtained from the cell site classification and comparison of metrics corresponding to the profitable cell sites and the unprofitable cell sites, and sending the compiled information to a workstation.

In an embodiment, a method of evaluating subscriber usage of cell sites in various markets is disclosed. The method comprises reading revenue data and usage data from a data store, wherein the usage data comprises data about cell site usage of each of a plurality of wireless communication service subscribers, and wherein the revenue data comprises data about revenue obtained by a wireless communication service provider from each of the wireless communication service subscribers, analyzing the usage data for each subscriber to determine a set of cell sites most used by the subscriber, wherein the set of most used cell sites is a predefined number of cell sites and is identified from among a plurality of cell sites operated by the wireless communication service provider, associating a portion of the revenue data for each subscriber to the set of cell sites most used by that subscriber, reading expense data for each of the plurality of cell sites from a data store, wherein the expense data represents the expense of operating the cell site, reading capital cost data for each of the plurality of cell sites from a data store, wherein the capital cost data represents the capital cost associated with the cell site, determining a return on invested capital (ROIC) value for each of the plurality of cell sites based on the portion of revenue data of each subscriber associated to the cell site, based on the expense data associated to the cell site, and based on the capital cost data associated to the cell site, and storing the return on invested capital (ROIC) value for each cell site in a data store comprising cell site information, wherein the data store comprising cell site information is accessible to users associated with a plurality of workstations.

In an embodiment, a server for managing cell site performance is disclosed. The server comprises a processor, a memory, and an application stored in the memory. When executed by the processor, the application reads revenue data and usage data from a data store, wherein the usage data comprises data about cell site usage of each of a plurality of wireless communication service subscribers, and wherein the revenue data comprises data about revenue obtained by a wireless communication service provider from each of the wireless communication service subscribers. The application further analyzes the usage data for each subscriber to determine a set of cell sites used by the subscriber, wherein the set of used cell sites is identified from among a plurality of cell sites operated by the wireless communication service provider. The application further associates a portion of the revenue data for each subscriber to the set of cell sites used by that subscriber, reads expense data for each of the plurality of cell sites from a data store, wherein the expense data represents the expense of operating the cell site, and reads capital cost data for each of the plurality of cell sites from a data store, wherein the capital cost data represents the capital cost associated with the cell site. The application further generates an income statement and partial balance sheet for each of the plurality of cell sites based on the expense data and the capital cost data and determines a profitability metric value for each of the plurality of cell cites based on the income statement and the partial balance sheet for each of the plurality of cell sites. The application further stores the profitability metric value for each cell site in a data store comprising cell site information, wherein the data store comprising cell site information is accessible to users associated with a plurality of workstations, compares the profitability metric value of a selected cell site to the profitability metric value of a selection of other cell sites, and, based on the comparison, provides a recommendation to one of perform a technology upgrade on the selected cell site, perform an adjustment procedure on the selected cell site, or build a new cell site proximate to the selected cell site.

In an embodiment, a method of assessing metrics associated with cell sites to manage cell site performance is disclosed. The method comprises reading revenue data and usage data from a data store, wherein the usage data comprises data about cell site usage of each of a plurality of wireless communication service subscribers, and wherein the revenue data comprises data about revenue obtained by a wireless communication service provider from each of the wireless communication service subscribers and analyzing the usage data for each subscriber to determine a set of cell sites used by the subscriber, wherein the set of used cell sites is identified from among a plurality of cell sites operated by the wireless communication service provider. The method further comprises associating a portion of the revenue data for each subscriber to the set of cell sites used by that subscriber, reading expense data for each of the plurality of cell sites from a data store, wherein the expense data comprises the expense of operating the cell site, and reading capital cost data for each of the plurality of cell sites from a data store, wherein the capital cost data represents the capital cost associated with the cell site. The method further comprises determining a return on invested capital (ROIC) value for each of the plurality of cell sites based on the portion of revenue data of each subscriber associated to the cell site, based on the expense data associated to the cell site, and based on the capital cost data associated to the cell sites and storing the return on invested capital (ROIC) value for each cell site in a data store comprising cell site information, wherein the data store comprising cell site information is accessible to users associated with a plurality of workstations. The method further comprises accessing the data store comprising cell site information to retrieve the ROIC value for each of the plurality of cell sites and identifying cell sites with ROIC values above a predefined threshold, wherein the identified cell sites with ROIC values above the predefined threshold are classified as profitable cell sites. The method further comprises classifying cell sites with ROIC values below the predefined threshold as unprofitable cell sites, determining the metrics corresponding to the profitable cell sites and the metrics corresponding to the unprofitable cell sites, wherein the metrics comprise subscriber details, locations, and markets associated with the cell sites, and comparing the metrics corresponding to the profitable cell sites with the metrics corresponding to the unprofitable cell sites, wherein differences among the cell sites are identified. The method further comprises determining changes to be implemented at the unprofitable cell sites to optimize metrics and increase ROIC values based on the differences among the cell sites, compiling information obtained from the cell site classification and comparison of metrics corresponding to the profitable cell sites and the unprofitable cell sites, sending the compiled information to a workstation, and recommending the changes to be implemented at the unprofitable cell sites.

In an embodiment, a method of managing cell site performance based on evaluating subscriber usage of cell sites in various markets is disclosed. The method comprises reading revenue data and usage data from a data store, wherein the usage data comprises data about cell site usage of each of a plurality of wireless communication service subscribers, and wherein the revenue data comprises data about revenue obtained by a wireless communication service provider from each of the wireless communication service subscribers. The method also comprises analyzing the usage data for each subscriber to determine a set of cell sites used by the subscriber, wherein the set of used cell sites is identified from among a plurality of cell sites operated by the wireless communication service provider and associating a portion of the revenue data for each subscriber to the set of cell sites used by that subscriber. The method also comprises reading expense data for each of the plurality of cell sites from a data store, wherein the expense data represents the expense of operating the cell site and reading capital cost data for each of the plurality of cell sites from a data store, wherein the capital cost data represents the capital cost associated with the cell site. The method further comprises determining a return on invested capital (ROIC) value for each of the plurality of cell sites based on the portion of revenue data of each subscriber associated to the cell site, based on the expense data associated to the cell site, and based on the capital cost data associated to the cell site and storing the return on invested capital (ROIC) value for each cell site in a data store comprising cell site information, wherein the data store comprising cell site information is accessible to users associated with a plurality of workstations. The method further comprises recommending to one of perform a technology upgrade on a selected cell site, perform an adjustment procedure on the selected cell site, or build a new cell site proximate to the selected cell site based on the return on invested capital of the selected cell site.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
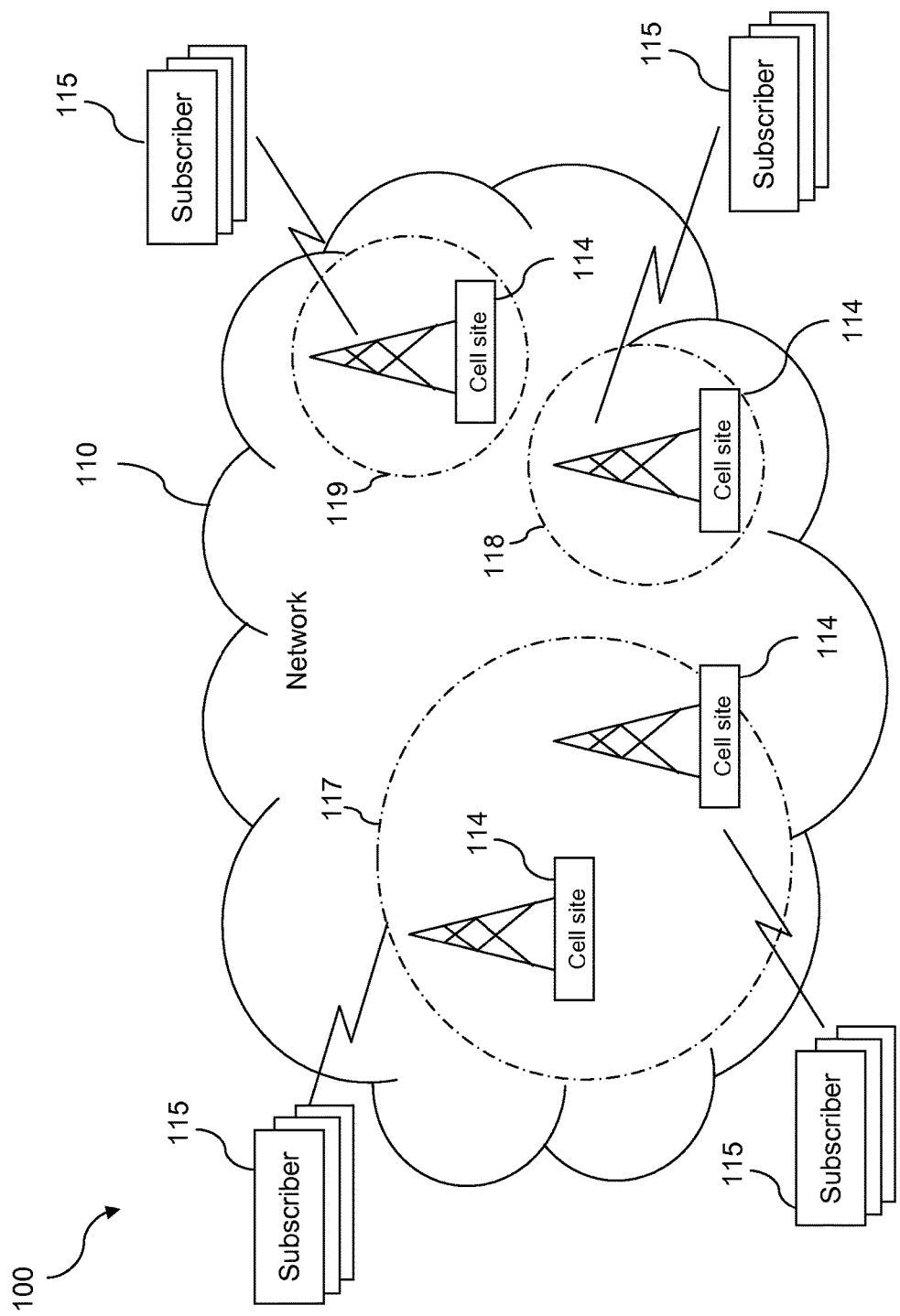
FIG. 1 is an illustration of a wireless communication system according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Wireless communication service providers in the telecommunications industry may employ a plurality of cell sites to provide coverage for wireless communication service subscribers in different areas in a cellular network. Cells sites may comprise antennas and electronic communications equipment, wherein the cell sites may be located in populated, rural, and/or remote areas. Some cell sites may be located in densely populated urban areas, whereas other cell sites may be located in sparsely populated remote areas. In an embodiment, cell sites located in sparsely populated remote areas may be referred to as connector sites, wherein connector sites may be employed alongside highways across the country in order to provide ubiquitous coverage in remote areas. In another embodiment, some connector sites may generate more revenue than other connector sites due to subscriber demographics, location, and other economic factors.

Conventionally, wireless communication service providers may track costs and revenue generated across a cellular network without determining what portions of the cost and revenue financial data are due to specific cell sites based on network performance, usage, and/or subscriber details pertaining to individual cell sites. These current methods may not present service providers with an accurate financial view of each individual cell site with respect to subscriber data and network metrics. Service providers may conventionally average financial metrics across a plurality of cell sites in the cellular network without attributing differences in metrics to specific cell sites. For example, using methods developed in the past, a service provider may obtain total financial metrics for the whole cellular network and then average the values evenly across many cell sites, for example a cell site A and a cell site B. This kind of averaging approach, however, is unable to take account of the real economics of individual cell sites. For example, cell site A may actually cost less than cell site B and may also generate more revenue than cell site B. An economic analysis that relies on averages may not identify the different economic performance of cell site A versus cell site B.

Thus, as one example, when distributing a limited budget for cell site improvement, a more granular analysis may warrant attributing a greater proportion to cell site A on the theory of more return on invested capital (ROIC). Alternatively, on a different theory, the analysis may warrant attributing a greater proportion to cell site B to help overcome location handicaps that may result in cell site B's low revenue and high expenses. Neither of these strategies may be supported by the cell site metric averaging approach of the prior art. The present disclosure teaches a new approach that may be referred to in some contexts as a de-averaging approach, an approach that instead assigns and/or allocates specific costs and revenues to cell sites based on the circumstances of the individual cell sites. An automated tool that does the de-averaged analysis of cell site profitability, for example an application executing on a computer, may automatically recommend upgrading one cell site to a next generation technology while not upgrading another cell site or recommend adjusting electronic equipment at one cell site or recommend building a new cell site proximate to one of the cell sites. As discussed further below, the de-averaged analysis may take into account costs associated with roaming proximate to one of the cell sites, which can be used to more accurately assess the justification for building a new cell site generally in the vicinity of the subject cell site and thereby reduce roaming costs allocated and/or assigned to the subject cell site.

Differences among cell sites A and B may not be identified when the financial metrics are averaged across the plurality of cell sites. In terms of investment and decision making, this information may be beneficial for the service provider to possess in order to facilitate decision-making for current cell site improvement and future cell site investments. Therefore, there may be a need to quantify network economics from a cell site level in order to evaluate revenue and expenses relative to network operating metrics and subscriber usage at specific cell sites.

Disclosed herein are systems and methods for an economic analysis of individual cell sites, a de-averaged economic analysis of individual cell sites. In order to perform an economic analysis of individual cell sites, the disclosed system may first read revenue data and usage data corresponding to each of a plurality of wireless communication service subscribers. From the usage data for a subscriber, the set of cell sites used by that subscriber may be determined, and a portion of the revenue derived from that subscriber may be attributed to that set of cell site used by that subscriber proportionally to the subscriber's use of each cell site. If 75% of the subscriber's communication traffic is handled by cell site A, for example, 75% of the subscriber's revenue may be allocated to cell site A. This process may be repeated for all the subscribers of the wireless communication service provider and across all the cell sites to determine or attribute site specific revenue for each of the cell sites. Once the site specific revenue has been attributed, the system may determine the expense data for each of the individual cell sites, as well as the capital cost data for each of the individual cell sites, wherein the values of expense data and capital cost data for different cell sites may be different. As referred to herein, the term "site specific" may be employed to refer to revenue, expenses, and/or capital costs that are attributed to individual cell sites.

Site specific expenses may comprise expenses associated with operation, backhaul infrastructure, utilities, access, service, roaming, sales, and marketing for each cell site. Roaming expenses may comprise expenses associated with roaming events and may correspond to roaming fees paid by the service provider to another service provider associated with the roaming network. In an embodiment, expenses associated with roaming events may be assigned to specific cell sites based on a calculation or estimation of what cell site or cell sites might otherwise have provided service to support the roaming event. Said in other words, roaming expenses may be imputed to cell sites that might have obviated the roaming, for example if their coverage were better, if their signal were stronger, and the like. Taking such roaming expenses into consideration may provide analysis value by allowing consideration to be given to costs that may be saved, for example roaming costs that may be saved, if a cell site is enhanced. Omitting including roaming costs in site specific expenses might make that kind of analysis difficult if not impossible. In an embodiment, some roaming events may be excluded from consideration, for example roaming events that are beyond an acknowledged service coverage boundary. Site specific capital costs may comprise spectrum, property, plant, and equipment costs of each cell site.

From the site specific revenue, site specific expenses, and site specific capital costs, the disclosed system may calculate a return on invested capital (ROIC) value for each cell site in order to evaluate the overall profitability of cell sites based on subscriber usage. A ROIC value may be defined as the value of net operating profit after taxes divided by the value of net invested capital. A ROIC value may be represented as a percentage. A positive ROIC value may indicate a profitable cell site, whereas a negative ROIC value may indicate an unprofitable cell site. Wireless communication service providers may desire to determine cell site specific ROIC values in order to identify profitable cell sites, deconstruct the components of profitable cell sites, and implement these components in unprofitable cell sites. While this example refers to ROIC, it is understood that the present disclosure contemplates calculating other profitability metrics for each cell site, either instead of ROIC or in addition to ROIC. Some of these alternative profitability metrics are identified hereinafter.

A cell site economic analysis system may be employed to assess site specific revenue, site specific expenses, and site specific capital costs in different types of markets and allow comprehensive decisions to be made in regards to the long-term profitability of building new cell sites, improving, enhancing, maintaining, adjusting, and/or expanding upon current cell sites in the network. For example, the disclosed system may also allow the service provider to identify market drivers for long-term growth and profitability in building a wireless infrastructure. By building new cell sites and/or improving upon current cell sites, the service provider may maintain customer satisfaction among its wireless communication service subscribers and increase the probability that subscribers will maintain their service with their wireless communication service provider rather than switching to a different provider.

Conventional methods for tracking revenue may fail to capture the extent of subscriber usage in a variety of cell sites, resulting in data which may not promote accurate forecasting of profitability and decision-making regarding current and new cell sites. Thus, the disclosure teaches a system that takes into consideration various factors, such as location, market, and subscriber details, which may help analysts to gain counterintuitive insights from information about ROIC values at each cell site. In an embodiment, the disclosed system may first determine, for each subscriber, a small number of cell sites most frequently used by the subscriber, for example, the five cell sites most frequently used by the subscriber. Alternatively the system may determine the ten most frequently used cell sites, the twenty most frequently used cell sites, or some other number of most frequently used cell sites. The system may then associate a portion of the revenue derived from that subscriber to the cell sites most frequently used by that subscriber, repeating this process for each of the subscribers. In this determination the different fees or subscription rates of each subscriber is used. This produces an assignment of revenue to each cell site based on the subscribers' usage of each cell site and based on the revenue associated with the specific subscribers who most frequently use each cell site.

In an embodiment, the most frequently used cell sites may not be determined. Instead, each of the cell sites used by the subscriber during an analysis period (e.g., a month or some other period over which the ROIC analysis is performed) is identified, the amount that the subscriber used each cell site is determined, and the subscriber's fees or subscription rate is assigned to each cell site based on the amount the subscriber used the cell site. This determination is repeated for each of the subscribers. It is an implementation decision that one skilled in the art, in combination with the teachings of the present disclosure, can readily make according to the goals and objectives he or she is pursuing in analyzing a subject wireless communication network.

Additionally, site specific expense data and site specific capital cost data may be determined for each of the cell sites. ROIC values may then be calculated for each cell site, wherein the ROIC values may be compiled in a data store comprising cell site information. The data store comprising cell site information may be accessed by users at workstations, wherein the users may be associated with the wireless communication service provider. From the data store comprising cell site information, the wireless communication service provider may examine subscriber information such as the morphology and demographics of a customer base and the type of area at which a cell site is located. The service provider may use this information to understand the reasoning behind the revenue generated at each cell site, including cell sites with positive or negative ROIC values. Ultimately, the data collected from a cell site economic analysis system may allow service providers to optimize their network at a cell site level.

The de-averaging analysis of cell sites performed by the system and/or tool may be grouped according to criteria to determine a profitability norm for cell sites across a group or class of cell sites and then the profitability of individual cell sites may be compared against the appropriate profitability norm determined for the group or class of cell sites to which they each belong. For example, a profitability metric of a suburban cell site may be compared with the profitability norm for other suburban cell sites across the entire nation, across a major metropolitan area, or across one specific suburb. Such a comparison may reveal a more meaningful assessment of the subject cell site's profitability and promote better recommendations for managing the subject cell site. It is contemplated that a variety of different criteria may be used for grouping cell sites by commonly shared characteristics or environments. City groups, suburban groups, rural groups may be defined. College town groups may be defined. Event venue servicing groups may be defined, for example cell sites that are located in the vicinity of professional sports venues, such as an NFL football stadium.

In an embodiment, the system and/or tool may provide controls for a user to analyze the cell site specific data in a variety of different ways, for example to compare the profitability of a cell site to different group norms. For example, the tool may allow the user to compare the profitability of a cell site located in Irving, Tex., to a nation-wide suburban cell site profitability norm, to a suburban Dallas-Fort Worth Metroplex cell site profitability norm, or to an Irving cell site norm (where Irving is a suburb in the Dallas-Fort Worth Metroplex). Comparing the cell site profitability to these different norms may provide new insights to the analyst and may drive more insightful selections of action plans.

In an embodiment, the system and/or tool may provide controls for a user to provide indications of preferred action plans. For example, the user may select minimization of capital expenditures. The user may select maximization of income. The user may be able to select a trend in one or more of the inputs to the analysis of the cell site profitability, for example to select a trend in one or more of the expenses or one or more of the revenues associated with the cell site. Alternatively, the system and/or tool may provide a range of action recommendations, each recommendation accompanied with an automated summary of how the subject action may be expected to change expenses, revenues, and or profitability of the subject cell site.

Turning now to FIG. 1, a communication system 100 is disclosed. The system 100 may comprise a network 110, a plurality of cell sites 114, a plurality of subscribers 115, and a plurality of markets 117-119. The network 110 may comprise a cellular network that allows communication over the plurality of cell sites 114, wherein the plurality of cell sites 114 may comprise antennas and electronic communications equipment. Communication may occur over the network based on one or more of a code division multiple access (CDMA) wireless communication protocol, a global system for mobile communications (GSM) wireless communication protocol, a long-term evolution (LTE) wireless communication protocol, a worldwide interoperability for microwave access (WiMAX) wireless communication protocol, or another cellular wireless communication protocol.

Each cell site 114 may be associated with a plurality of subscribers 115 based on the frequency of use by each subscriber 115 at each cell site 114 within an analysis period (e.g., within a month or some other analysis period). For example, a first user may use cell sites A, B, C, D, and E; a second user may use cell sites A, D, G, K, and M; and a third user may use cell sites D, R, S, T, and W. Thus, cell site A is associated with the first and second user but not the third user. Cell sites B and C are associated only with the first user. Cell site D is associated with the first, second, and third user.

Each subscriber 115 may access wireless communication service through a transient wireless link between a communication device and the cell site 114. The plurality of subscribers 115 may possess communication devices that are subscribed to receive cellular wireless communication service over the network 110. The plurality of subscribers 115 may employ a variety of communication devices for usage of any cell site 114, including mobile devices, smartphones, personal digital assistants (PDAs), personal computers, media players, or other devices. Usage of any cell site 114 may comprise phone calls, text messages, multimedia messages, and other data usage via the network 110.

The plurality of cell sites 114 may be located in populated, suburban, urban, rural, and/or remote areas. One or more cell sites 114 may be associated with a plurality of markets 117-119 in the network 110. The plurality of markets 117-119 may refer to different communities of predefined sizes (e.g., communities of 100,000 subscribers or more). In an embodiment, Dallas, Fort Worth, Austin, Abilene, Lubbock, and Houston may represent examples of some of the markets in Texas. Wireless communication service may be offered to subscribers 115 within these different communities or markets, wherein subscribers may access this service through the network 110. In an embodiment, cellular network coverage may be provided by a wireless communication service provider in a plurality of markets 117-119 across the country. The plurality of markets 117-119 may have different characteristics which may affect the amount of revenue generated at cell sites 114 in some markets as opposed to cell sites 114 in other markets. Although only four cell sites 114, four corresponding groups of subscribers 115, and three markets 117-119 are shown in FIG. 1, there may be any number of cell sites 114, subscribers 115, and markets 117-119 in the network 110. The number of cell sites 114 and subscribers 115 located in each of the markets 117-119 may also vary.

In a cellular network such as network 110, some cell sites 114 may be more profitable than other cell sites 114. Profitability at cell sites 114 may be determined based on using site specific revenue, site specific expenses, and site specific capital costs to calculate corresponding ROIC values at each cell site 114, wherein positive and negative ROIC values may be identified in order to distinguish between profitable and unprofitable cell sites 114, respectively. For example, ROIC=(cell site revenue−cell site cost)/cell site invested capital It is understood that cell site revenue may include both cell site specific revenue, as described above, as well as non-site specific revenue, such as ad revenue that may be allocated across multiple sites. It is understood that cell site cost may include both cell site specific costs, as described above, as well as non-site specific costs or quasi-non-site specific costs, such as costs for wireless service provider enterprise marketing, costs for wireless service provider enterprise management, and the like. It may be beneficial for wireless communication service providers to be able to determine ROIC values and distinguish specific profitable cell sites from specific unprofitable cell sites in order to isolate the components of profitable cell sites and implement these positive characteristics in unprofitable cell sites.

Differences in profitability of cell sites 114, as identified by cell site specific ROIC values, may occur due to a variety of reasons. One explanation may be related to differences in subscribers at each cell site 114. Some subscribers 115 may use certain cell sites 114 more than other cell sites 114, and different subscribers 115 may be associated with different yield rates and/or different revenue versus service consumption ratios. From the analysis of profitability based on differential subscriber usage at cell sites 114 and differential subscriber yield rates, subscriber details corresponding to specific cell sites 114 may be characterized. Subscriber details may refer to various features that affect revenue generated at specific cell sites 114.

In an embodiment, the plurality of subscribers 115 may have different types of mobile devices, cell phone plans, and subscription accounts which may affect revenue generated at specific cell sites 114. The plurality of subscribers 115 may pay a wireless communication service provider for access to wireless communication service. The service provider may offer different types of mobile devices, cell phone plans, and subscription accounts to the subscribers 115. For example, some subscribers 115 may choose to purchase outdated mobile devices (e.g., flip-phones), whereas other subscribers may purchase newer mobile devices (e.g., smartphones). In an embodiment, subscribers 115 may purchase mobile devices from the service provider. Alternatively, subscribers 115 may purchase mobile devices at wholesale from distributors separate from the service provider.

When purchasing from the service provider, the type of mobile device that the subscriber 115 chooses may affect the amount of revenue that the service provider may receive from selling the phone. For example, outdated mobile devices such as flip-phones may cost less than newer mobile devices such as smartphones. Therefore, the service provider may offer outdated mobile devices at full price to subscribers 115, whereas the service provider may offer subsidized smartphones at discounted prices to subscribers 115. That is, the smartphones may be purchased at a lower fraction of the retail cost. However, each subscriber 115 who purchases a smartphone may pay recurring monthly fees (e.g., for a monthly data plan) associated with the smartphone during a two-year contract with the service provider as indicated by his or her subscription account. Subscribers 115 with outdated mobile devices such as flip-phones may not need to pay such fees. Therefore, the type of mobile device that subscribers 115 purchase may affect the amount of revenue that the service provider receives from each subscription account accordingly. It is understood that the costs of subsidies for phone purchase by subscribers may impact revenue and may be included in the analysis directly or indirectly.

Additionally, the type of mobile device that the subscriber 115 chooses may affect the type of cell phone plan that the subscriber 115 is able to purchase and the amount of revenue that the service provider may receive from selling the cell phone plan. For example, subscribers 115 with flip-phones may purchase cheaper basic plans for voice and/or text, whereas subscribers 115 with smartphones may purchase more expensive plans with voice, text, and data. As another example, subscribers 115 may utilize prepaid cell phone plans or postpaid cell phone plans. Prepaid plans may allow subscribers 115 to pay for usage in advance, wherein there may be a prepaid credit amount associated with each subscriber account. Postpaid plans may allow each subscriber 115 to receive a bill after a certain period of usage (e.g., after every billing cycle). Prepaid plans may be provided to low-income subscribers 115 who may not be able to afford traditional postpaid plans. In another embodiment, subscribers 115 may have corporate-liable subscription accounts or individual-liable subscription accounts. In a corporate-liable subscription account, the mobile device may be company-owned, while in an individual-liable subscription account, the subscriber 115 may own the mobile device. Ultimately, the type of cell phone plan and subscription account that each subscriber 115 chooses may affect the revenue generated at each of the plurality of cell sites 114.

Other factors that may affect the profitability of cell sites 114 in the network 110 include the location and market associated with each cell site 114. In an embodiment, the location of a cell site 114 may affect profitability in that a cell site 114 that is located in a highly populated area may be more profitable than another cell site 114 that is located in a remote area. This disparity in revenue may occur due to varying numbers of subscribers 115 using the two cell sites 114. Each subscriber 115 in the plurality of subscribers 115 may employ a set of cell sites 114 more than other cell sites 114 in the network 110. In an embodiment, each subscriber 115 may employ cell sites 114 that are close to his or her residence, workplace, school, and roads or highways used by the subscriber 115 when traveling. Thus, the revenue generated by the subscribers 115 may be associated with a small number of cell sites 114 most used by each subscriber 115.

In an embodiment, the cell site 114 in a remote area may be employed less than the cell site 114 in a highly populated area due to less subscriber 115 traffic in the remote area. The cell site 114 in the highly populated area may be used more because of a greater number of subscribers 115 passing by that cell site 114. Due to a higher subscriber 115 usage that is dependent on location, the cell site 114 in the highly populated area may generate more revenue for the service provider than the cell site 114 in the remote area. However, this assumption may not be the case for every cell site 114. For example, some cell sites 114 in rural areas may perform better in terms of providing reliable service and generating more revenue than other cell sites 114 in urban areas. Each cell site 114 may differ in profitability, and these metrics may not easily be predicted based on generalized assumptions. Therefore, the disclosed economic analysis system that evaluates network performance on a cell site level based on differential subscriber usage may allow the service provider to better understand the factors involved in a profitable cell site.

In an embodiment, revenue generated at various cell sites 114 may additionally be affected by market characteristics, wherein a market (such as market 117-119) may be defined as a particular community of predefined size. In an embodiment, cellular network coverage may be provided by a wireless communication service provider in a plurality of markets 117-119 across the country. The plurality of markets 117-119 may have differences among themselves with respect to economic performance affecting characteristics. For example, the subscriber 115 associated with a certain market, such as market 117, may be considered transitional, in that a transitional subscriber 115 shifts to different locations over the year and may therefore be associated with multiple markets 117-119. However, conventional telecommunications billing systems may assign revenue generated by the transitional subscriber 115 to a single market based on the subscriber's billing address or based on the location of the subscriber's telephone number as defined by the North American Number Plan.

By way of further example, a transitional subscriber 115 may be a college student who is typically associated with a market (e.g., market 117) corresponding to his or her parents' address. However, the college student may not live in the same market as his or her parents and may go to school in another market (e.g., market 118) in a different city or a different state. Thus, the revenue and expense associated with the college student's usage may not be assigned to the appropriate market. That is, the revenue and expense generated by the college student may be assigned to market 117 instead of market 118. Therefore, as seen in this example, some markets may mistakenly be shown to be more profitable than they actually are, while revenue in other markets may be inadequately represented due to the plurality of transitional subscribers 115. This deficiency in capturing subscriber usage in different markets may result in discrepancies in revenue and/or expense, while portraying an inaccurate view of data for future economic analysis of cell sites in different markets.

Therefore, the disclosure teaches methods for accurately analyzing subscriber, location, and market characteristics corresponding to specific cell sites, in order to determine ROIC values and/or other financial or economic analyses such as profitability, EBITDA (earnings before interest, tax, depreciation, and amortization), NOPAT (net operating profit after tax), and others, with respect to site specific revenue, site specific expenses, and site specific capital cost data for individual cell sites in the cellular network. This may be referred to in some contexts as a non-averaging analysis process or as a de-averaging process. A ROIC value may be calculated by subtracting expenses from the revenue generated with respect to taxes and dividing the computed value by the value of the net investor capital. In order to calculate the ROIC values on a cell site level, the total revenue, expenses, and capital in the network 110 may be attributed accordingly to each cell site 114. The attribution of these metrics may not be straightforward and may entail further classification and analysis in order to determine cell site specific ROIC values.

In the cellular network 110, the total revenue generated at the plurality of cell sites 114 may be divided into different levels or tiers of revenue. In an embodiment, first tier revenue may be identified as revenue generated from subscriber usage at specific cell sites 114. For example, the service provider may determine a set of cell sites 114 used by each of the subscribers 115 in the cellular network 110 and determine how much revenue is to be attributed to each cell site 114 based on this subscriber usage. The revenue derived from a subscriber 115 may be determined as an average revenue per user or unit (ARPU). ARPU values may indicate the average monthly revenue generated by the subscriber 115 or by units provisioned for service, wherein the units are associated with the subscriber 115. There may be an ARPU value associated with each subscriber 115 in the plurality of subscribers 115, and those ARPU values may be different.

For example, a first user may have an ARPU of $800/month while a second user may have an ARPU of $150/month. First tier revenue such as ARPU may be attributed to cell sites based on subscriber usage per cell site 114. For example, the ARPU of a subscriber may be attributed to the cell sites most frequently used by the subscriber proportional to the subscriber's frequency of use of each cell site. For example, if the third user uses cell site D 60% of the time, cell site R 15% of the time, cell site S 10% of the time, cell site T 5% of the time, cell site W 3% of the time, and other cell sites 7% of the time, 60/93 of the third subscriber's $600/month ARPU may be attributed to cell site D (about $387/month); 15/93 of the third subscriber's ARPU may be attributed to cell site R (about $97/month); 10/93 of the third subscriber's ARPU may be attributed to cell site S (about $65/month); 5/93 of the third subscriber's ARPU may be attributed to cell site T (about $32/month); and 3/93 of the third subscriber's ARPU may be attributed to cell site W (about $19/month). Costs may also be assigned to cell sites in a similar way. That is, costs associated with the third user may be distributed to the cell sites proportional to the usage of the cell sites by the third user during an analysis period, for example during a given month.

Other metrics that may be associated with ARPU values for the subscribers 115 may comprise minutes of usage (MOU) for voice calls and the number of megabytes (MB) associated with data usage. In an embodiment, the value of minutes of usage (MOU) for voice calls may be converted to a MB value based on the rate at which the vocoder in the subscriber's mobile communication device processes information. For example, voice corresponding to MOU may be analyzed and transformed into a signal via the vocoder. The resulting MB value for voice may be combined with the MB value associated with data usage to produce a single MB value for total usage. From the ARPU value and MB total usage value, a yield value may be calculated for each subscriber 115. Yield may be defined as the dollar amount of revenue divided by the MB total usage value.

In another embodiment, second tier revenue may be identified as general revenue that is non-site specific to the subscribers 115 or any particular cell sites 114. For example, second tier revenue may be generated from advertisements. Second tier revenue may be assigned based on billing account number usage per cell site 114. This revenue information may be maintained in a data store, wherein data may be retrieved to calculate ROIC values at the plurality of cell sites 114.

In addition to identifying revenue information, it may be beneficial for the service provider to calculate and assign site specific expenses at a cell site level (e.g., attributing costs to specific cell sites differently, based on actual costs of each specific cell site). Site specific expenses may comprise various expenses for operating each cell site, such as costs for equipment, service, operation, sales, marketing, administration, customer management, and other expenses. Operational expenses may comprise a variety of expenses related to network operations and wholesale expenses and may be divided into different tiers of expenses. First tier expenses may comprise expenses that are cell site specific, such as costs for rent, utilities, backhaul, and other expenses. First tier expenses may be assigned to the plurality of cell sites 114 based on which particular expenses were incurred to support which specific cell sites 114 in the network 110.

Another first tier expense that is attributed to the plurality of cell sites 114 may be associated with roaming. A roaming event may occur when a subscriber 115 of the network 110 connects to another roaming network while within a market (such as markets 117-119) of the network 110. For example, the subscriber 115 may not be able to find a signal to connect to network 110 in an area in which the service provider has attempted to make service available. Therefore, the subscriber 115 may connect to other roaming networks associated with other service providers and may incur roaming fees. The service provider of the network 110 may also be contracted to pay a fee to other service providers for each roaming event of the subscriber 115, wherein the subscriber 115 employs a roaming network associated with another service provider.

Further details about determining a location associated with a roaming event are described in U.S. patent application Ser. No. 12/395,025, filed Nov. 8, 2011, entitled "Generating Distance Bands," by Jason P. Sigg, et al., which is incorporated herein by reference in its entirety. After roaming locations have been determined, roaming expenses may be assigned to specific cell sites 114 in the market (such as markets 117-119) based on the locations of where the specific roaming events have occurred. Second tier expenses may comprise additional expenses that may be non-specific to any particular cell site 114. Therefore, in an embodiment, these second tier expenses may be prorated across the plurality of cell sites 114. Such second tier expenses may include general marketing expenses and business management personnel expenses.

In an embodiment, the system may track a customer to sales and marketing expenses and assign that cost in a site specific manner, assigning those sales and marketing expenses to the cell sites that the subject customer uses, proportional to the amount of use the customer makes of the subject cell sites. For example, if the customer is acquired through an on-line sales channel, the customer is assigned a sales and marketing cost that reflects the cost of procuring a subscriber through the on-line channel. The same may be true for subscribers that are acquired through a retail channel or a telesales channel, wherein each different channel may have different sales and marketing expenses allocated per subscriber acquired through that channel. In this way, cell sites that have a higher concentration of users that come through low cost channels such as on-line sales will have a lower sales and marketing expense than cell sites that have a higher concentration of users that come through the more expensive retail channel. This de-averaged analysis may promote a more faithful and accurate analysis of the specific economics of individual cell sites.

After assigning and attributing site specific expenses to the plurality of cell sites 114, net investor capital costs may also be attributed to each cell site 114. Capital costs may comprise a variety of costs and may be divided into different tiers. First tier capital costs may comprise property, plant, and equipment costs that are cell site specific, such as costs of antennas, base transceiver stations, remote radio transceivers, and other equipment costs for a specific cell site. In an embodiment, a capital cost may be associated with obtaining licenses from the Federal Communications Commission (FCC), in order to attribute spectrum for wireless communication at the plurality of cell sites 114. Said in other words, first tier capital costs may further comprise spectrum costs. Alternatively, in an embodiment, spectrum costs may be considered to be a second tier capital cost, as described below.

Second tier capital costs may comprise general costs that are related to cell sites 114. For example, these costs may be for core infrastructure such as switches that support different cell sites 114. These second tier capital costs may not be cell site specific and may be assigned to corresponding cell sites 114, depending on which sites the corresponding infrastructure supports. In an embodiment, spectrum costs may be considered to be another second tier capital cost. Third tier capital costs may comprise non-cell site related costs, which may be allocated to cell sites 114 based on the weighting of the tier 1 and tier 2 assignments. Once the total revenue, expenses, and net invested capital costs have been attributed to the plurality of cell sites 114, ROIC values and/or other profitability metrics may be calculated at each cell site 114 with respect to the subscriber information.

Figure 2:
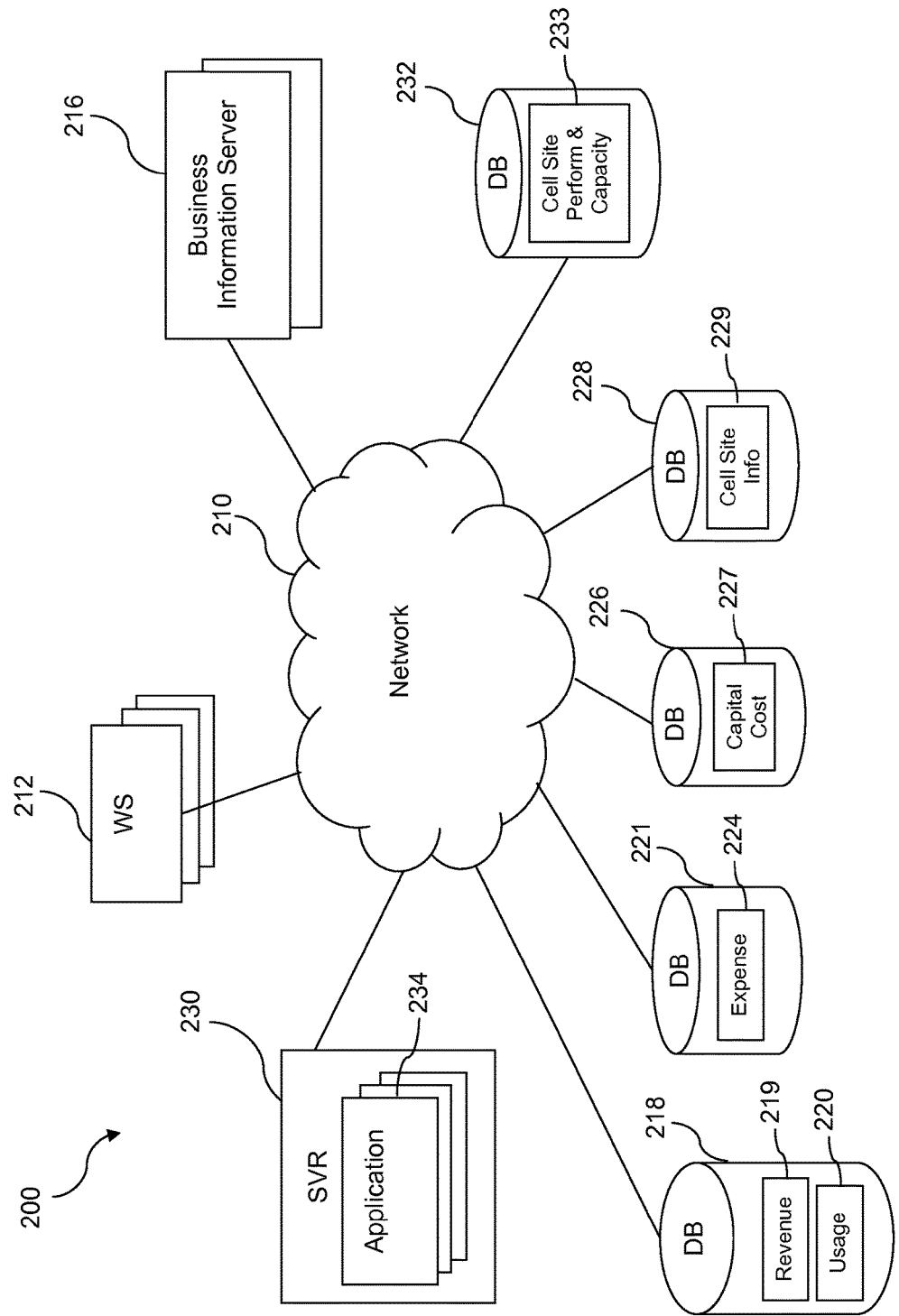
FIG. 2 is a block diagram of a system according to an embodiment of the disclosure.

Turning now to FIG. 2, a system 200 is disclosed. The system 200 may comprise a network 210, a plurality of workstations 212, a business information server 216, and a plurality of data stores 218, 221, 226, 228, 231 and a server 230. The network 210 may comprise one or more communication networks and may be any combination thereof of private or public communication networks that interconnect components in system 200. It is understood that system 200 may comprise any number of workstations 212.

The plurality of workstations 212 may comprise laptops, desktops, and tablets, wherein each workstation 212 may be associated with a user with access to the server 230 and the plurality of data stores 218, 221, 226, 228, and 232. Users may employ the plurality of workstations 212 to request and access data via the server 230, wherein the users may be associated with a wireless communication service provider, for example business analysts who are employees of the service provider. The plurality of workstations 212 may be at any physical location, wherein each workstation 212 may not need be connected by a single network.

The business information server 216 may maintain and/or access a plurality of subscriber accounts and information related to each subscriber account. The business information server 216 may access information corresponding to each subscriber, such as the type of mobile device, cell phone plan, and account details related to the subscriber. In an embodiment, the business information server 216 may maintain subscriber accounts and information corresponding to wireless communication service subscribers in a cellular network, such as the plurality of subscribers 115 in the network 110. In an embodiment, subscriber account information may be stored in an external data store or in an internal data store accessible by the business information server 216. In an embodiment, the business information server 216 may be embodied as a data base and/or a data base management system (DBMS). Alternatively, the business information server 216 may access a separate data store or data base that comprises subscriber data and/or subscriber account data.

The business information server 216 may access the data store 218 comprising revenue data 219 and usage data 220. While illustrated as stored in a single data store 218, in an embodiment, the revenue data 219 may be stored in a first data store and the usage data 220 may be stored in a second data store. Revenue data 219 may comprise data about revenue obtained by the wireless communication service provider from each of the plurality of wireless communication service subscribers. In an embodiment, revenue data 219 may comprise average revenue per user (ARPU) values for each subscriber 115. There may be a distinct ARPU value for each subscriber 115, wherein ARPU values indicate the average monthly revenue generated by each subscriber 115, for example an average monthly revenue for a subscriber determined from a year of monthly subscriber revenues or some other period of calculation of the average.

Usage data 220 may comprise data about cell site usage for each of the wireless communication service subscribers. The usage data 220 may comprise internet protocol detail records (IPDRs) or summaries of IPDRs. As is known to one skilled in the art, IPDRs record Internet communication events. In some cases, voice traffic may be converted to data and may be tracked by IPDRs. The usage data 220 may further comprise call detail records (CDRs) or summaries of CDRs. Analysis of IPDRs, summaries of IPDRs, the CDRs or summaries of CDRs promotes the association of specific subscribers and their billable usage with specific cell sites where the usage of the specific subscribers is generated. In an embodiment, usage data 220 may comprise minutes of usage (MOU) for voice calls at specific cell sites 114 and the number of megabytes (MB) associated with data usage at specific cell sites 114 for each subscriber 115. From the usage data 220, the set of cell sites most used by each subscriber may be determined and analyzed.

The server 230 may further comprise the application 234, which may access and analyze information retrieved from the plurality of data stores 218, 221, and 226. The data store 221 may comprise expense data 224. Expense data 224 may represent site specific expenses for operating each cell site in the plurality of cell sites. Expense data 224 may further comprise site specific expenses associated with operation, backhaul infrastructure, utilities, access, service, roaming, sales, and marketing for each cell site. In an embodiment, the expense data 224 may comprise financial information obtained from one or more balance sheets or income statements associated with the wireless communication service provider, wherein financial information for the entire cellular network may be consolidated in a single database. Financial information may comprise site specific expenses for specific periods of times (e.g., billing cycles).

The data store 226 may comprise capital cost data 227. Capital cost data 227 may represent site specific capital costs associated with each cell site in the plurality of cell sites. Capital cost data 227 may comprise spectrum purchase cost, for example spectrum auctioned by the Federal Communications Commission (FCC). In an embodiment, capital cost data 227 comprises property, plant, and equipment costs of each cell site, such as costs of antennas, base transceiver stations, remote radio transceivers, and other equipment costs. Revenue data 219, usage data 220, expense data 224, and capital cost data 227 may be updated after each billing cycle, wherein the billing cycle is a predefined period of time determined by the wireless communication service provider. In an embodiment, the billing cycle may be 14 days, 1 month, or another period of time.

The application 234 may read revenue data 219, usage data 220, expense data 224, and capital cost data 227 from the plurality of data stores 218, 221, and 226. The application 234 may determine a set of cell sites 114 used by the subscriber 115. In an embodiment, the plurality of subscribers 115 may employ multiple cell sites 114 for wireless communication service. Each subscriber 115 may use a set of cell sites 114 more than other cell sites 114 in the network 110 due to proximity. In an embodiment, each subscriber 115 may employ cell sites 114 that are close to his/her residence, workplace, school, and roads or highways used by the subscriber 115 when traveling.

Therefore, the application 234 may associate a portion of the revenue data 219 for each subscriber with the set of cell sites used by the subscriber as identified in the usage data 220. That is, the application 234 may attribute revenue data 219 proportionately based on each subscriber's usage at each cell site. This proportional revenue attribution may allow a more granular financial analysis as opposed to conventional averaging methods. Other methods of attributed the revenue derived from a subscriber are also contemplated by the present disclosure From this revenue association, the application 234 may calculate a ROIC value or other profitability metrics for each of the plurality of cell sites based on the portion of revenue data 219 of each subscriber associated to the cell site, based on the expense data 224 associated to the cell site, and based on the capital cost data 227 associated to the cell site. The calculated ROIC values for each cell site may subsequently be stored in the data store 228. The data store 228 may comprise cell site information 229, wherein the cell site information 229 may be information associated with each cell site, such as network performance, capacity, calculated ROIC values, and other metrics for each cell site. This cell site information 229 may be accessible to users associated with the plurality of workstations 212.

Figure 3:
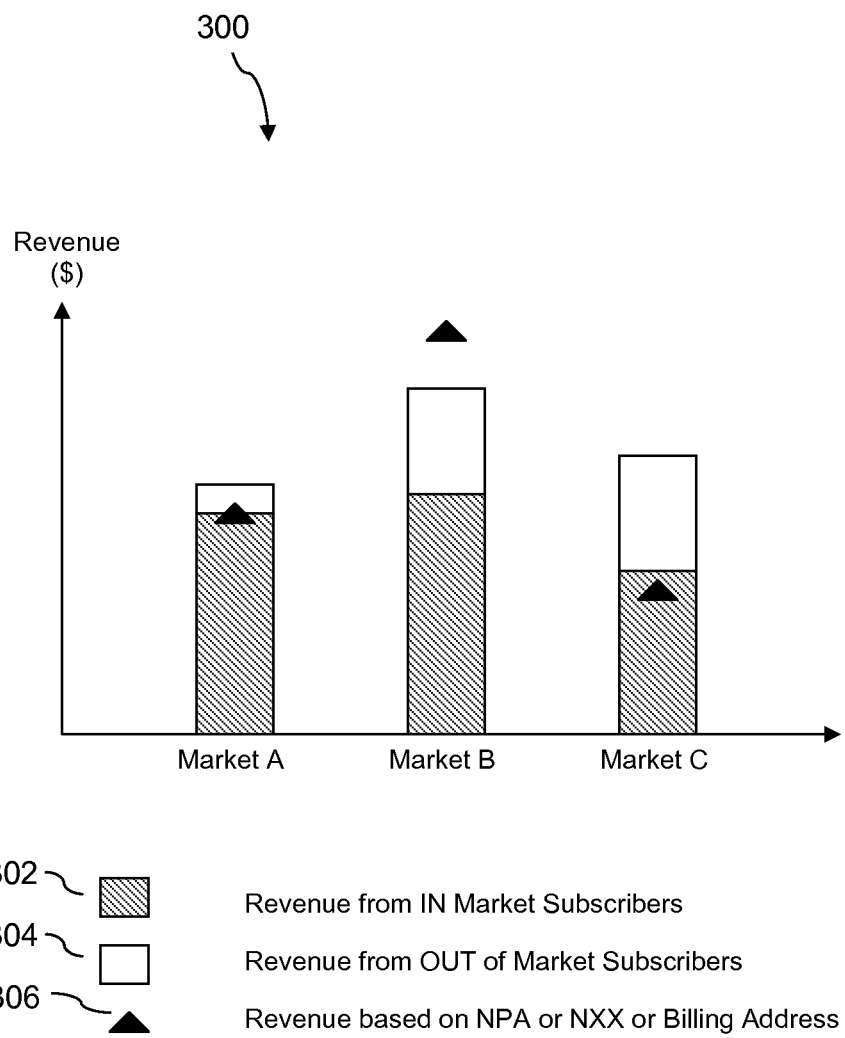
FIG. 3 illustrates a graph of revenue assignment in different markets according to an embodiment of the disclosure.

In an embodiment, the application 234 in the server 230 may retrieve information from another tool that allows multi-dimensional analysis of performance (MAP). MAP may be implemented by a separate tool or an internal tool accessible to the server 230, such as via a third-party software component. Data from MAP may be stored in any data store or server, such as in data stores 218, 221, 226, 228 or in the business information server 216. Turning now to FIG. 3, a graph 300 of an embodiment of revenue assignment in different markets is shown. Specifically, the graph 300 illustrates how the disclosed cell site economic analysis system may be advantageous in determining counterintuitive outcomes in terms of revenue generated within different markets. The graph 300 comprises revenue 302, 304, and 306 and illustrates the various revenues assigned within three different markets A, B and C. In an embodiment, markets A, B, and C may represent markets 117, 118, and 119 in FIG. 1, wherein each market refers to a different community of a predefined size.

Revenue 302 corresponds to revenue generated by in-market subscribers, wherein each in-market subscriber employs his or her mobile device within a same market as the market associated with his or her billing address. Revenue 304 corresponds to revenue generated by out-of-market subscribers, wherein each out-of-market subscriber employs his or her mobile device in a different market outside of the market associated with his or her billing address. Revenue 306 corresponds to revenue that a conventional telecommunications billing system may assign to a specific market based on billing addresses. In an embodiment, revenue 306 may be referred to as billed revenue.

In a conventional telecommunications billing system, revenue generated by subscribers may traditionally be assigned to different markets based on billing addresses or telephone numbers associated with the subscribers. In the past, the wireless communication service provider set up revenue attribution for a subscriber based on the billing address or based on the telephone number recorded in a call detail record (CDR) associated with the subscriber's account. The telephone number may be associated with a geographic location through the North American Numbering Plan (NANP). The NANP, which was initially set up as a standardized system for assigning numbers to landlines in the public switched telephone network, assigns telephone numbers to subscribers in the format of NPA-NXX-xxxx. "NPA", "NXX", and "xxxx" may indicate a number plan area code, a central office (exchange) code, and a subscriber number, respectively. One skilled in the art appreciates that wireless service providers may generally assign phone numbers to subscribers based on where they lived at the time they initiated their service plan and/or at the time they first initiated their phone number (i.e., in the context of number portability, users may move their residence and their wireless service provider while retaining their same telephone number). Many wireless service providers associate particular phone numbers to particular locations as an approximation or guess of the location of a mobile phone and the usage of the mobile phone, for example in the absence of better or more authoritative information.

A wireless subscriber may be assigned a 10-digit telephone number for his or her mobile device with a local number plan area code associated with his or her billing address. Therefore, even though a wireless subscriber may employ his or her mobile device in a plurality of areas, the revenue generated by the subscriber may be assigned to a market corresponding to his or her billing address or the local area code of the subscriber's account. This outdated system of revenue assignment may result in inaccuracies in the calculation of the amount of revenue generated in different markets by subscribers.

Different cases of revenue assignment are shown in markets A, B, and C in graph 300. In market A, most of the subscriber usage may be associated with subscribers with a billing address within market A as indicated by revenue 302, and the billed revenue 306 closely approximates revenue 302 generated by in-market subscribers. Revenue 304 from out-of-market subscribers has little effect on the revenue in market A and may be deemed negligible. In an embodiment, most of the subscribers who utilize cell sites in market A may also live in market A.

In a second case, the billed revenue 306 in market B is significantly higher than revenue 302 and revenue 304 generated from actual subscribers. The overbilled revenue 306 may be attributed to a large amount of out-of-market subscribers that are not taken into account for revenue assignment in market B. That is, subscribers with a NPA-NXX within market B may utilize their mobile devices outside of market B. In an embodiment, conventional telecommunications billing systems may not account for subscribers who have moved from a certain market to another market. For example, a subscriber may have received a handset in Dallas, Tex. with a telephone number associated with a local area code. However, the subscriber may move to Phoenix, Ariz. and use cell sites in a different market than the market associated with his or her NPA-NXX.

In another embodiment, subscribers associated with a certain market may be considered transitional, in that the subscribers shift to different locations over the year and may therefore be associated with multiple markets. For example, a transitional subscriber may be a businessman who may frequently travel out of town to a variety of different cities. The businessman's subscription account may be a corporate account that is billed to one market; however, the businessman's usage of cell sites may be spread across a plurality of markets associated with the variety of different cities to which he travels. In this case, revenue generated from transitional subscribers and other subscribers who have moved may not be properly assigned to the markets where the subscriber usage actually occurs. For example, subscribers with NPA-NXXs associated with market B may be utilizing cell sites in other markets all over the nation. Ultimately, the billed revenue 306 does not properly account for these market characteristics.

In a third case, the billed revenue 306 associated with a market may be under billed. In market C, most of the subscriber usage may be associated with subscribers with a NPA-NXX outside of market C. In this case, there may be a lot of out-of-market revenue 304 due to transitional subscribers. In an embodiment, a transitional subscriber may be a college student who is typically associated with a market corresponding to his or her parents. However, the college student may not live in the same market as his or her parents and may go to school in another market (e.g., market C) in a different city or state. Thus, the college student's usage in market C may not be represented in revenue 304, resulting in the under billed revenue 306.

Essentially, the market associated with a subscriber's billing address may not consistently be correlated with the market in which the subscriber uses his or her mobile device. Therefore, the disclosed cell site economic analysis system may allow wireless communication service providers to assign revenue according to which cell sites and markets in which subscribers have actually generated revenue. By implementing a cell site level revenue assignment based on subscriber usage, wireless communication service providers may acquire a better understanding of the overall network and corresponding metrics at specific cell sites.

Figure 4:
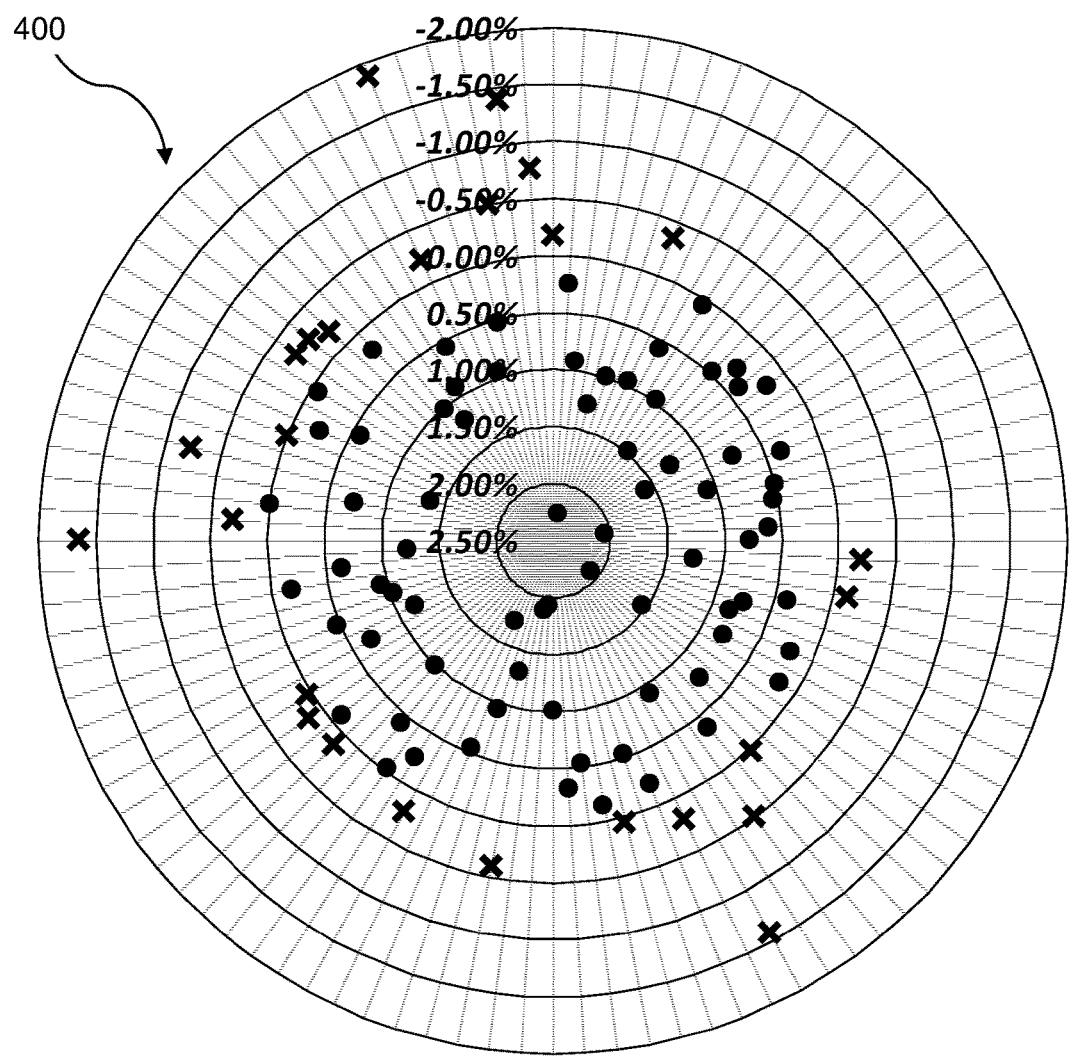
FIG. 4 illustrates a radar plot according to an embodiment of the disclosure.

The disclosed cell site economic analysis system may also be employed to assess ROIC values associated with specific cell sites and evaluate profitability. Turning now to FIG. 4, a radar plot 400 is shown. The plot 400 illustrates cell sites with ranging ROIC values in a specific market, wherein each dot in the plot 400 represents a cell site in the market. The values ranging from −2.0% to 2.5% represent negative and positive ROIC values corresponding to the cell sites. In the plot 400, the "X's" represent unprofitable cell sites with negative ROIC values, whereas the dots represent profitable cell sites with positive ROIC values. The cell sites closest to the center of the graph have the highest ROIC values, whereas the cell sites farthest from the center of the graph have the lowest ROIC values. As an example, 74% of the cell sites for this particular market have positive ROIC values, whereas 26% of the cell sites have negative ROIC values. In an embodiment, the market may represent a rural geographic location, wherein high profitability in cell sites is unexpected.

The disclosed cell site economic analysis system may therefore be used to determine counterintuitive findings similar to the data shown in plot 400 by analyzing ROIC values calculated by the system for cell sites in various markets. The disclosed system may identify profitable cell sites and analyze corresponding metrics associated with the profitable cell sites. For example, the wireless communication service provider may set a predefined threshold to evaluate profitability in cell sites with ROIC values above the predefined threshold. In an embodiment, the predefined threshold may be 0.5, 1, 2, or another set value. The disclosed system may then identify cell sites with ROIC values above and below the predefined threshold and classify these cell sites as profitable and unprofitable cell sites, respectively. From this data, the disclosed system may determine metrics such as subscriber details, locations, and markets associated with the profitable cell sites and determine changes to be implemented at the unprofitable cell sites to optimize metrics and increase ROIC values. In an embodiment, changes to be implemented at the unprofitable cell sites may comprise investing in marketing and advertising, updating equipment, increasing bandwidth, and improving network performance.

Figure 5A:
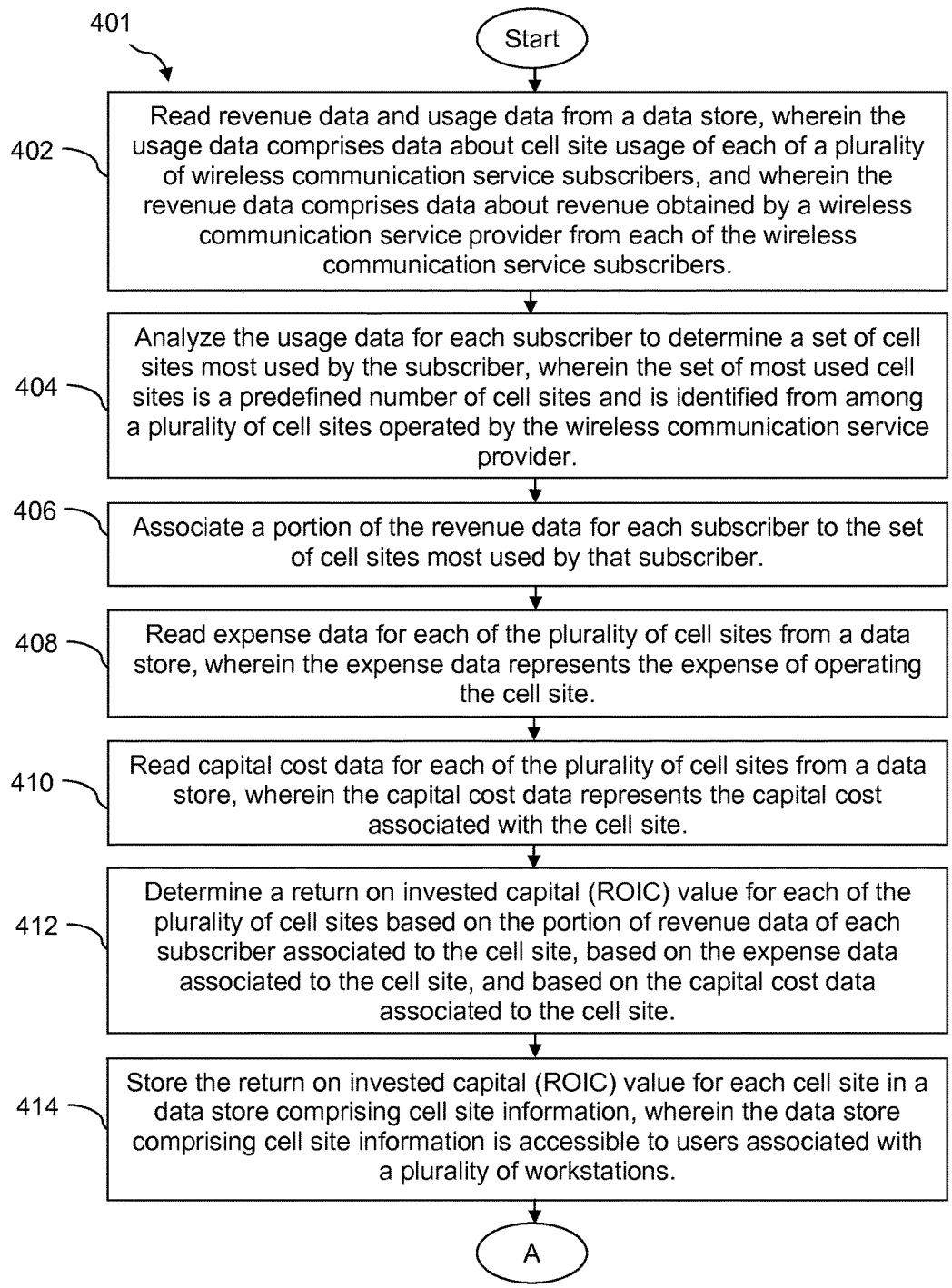
FIG. 5A and FIG. 5B is a flow chart illustrating a method according to an embodiment of the disclosure.
Figure 5B:
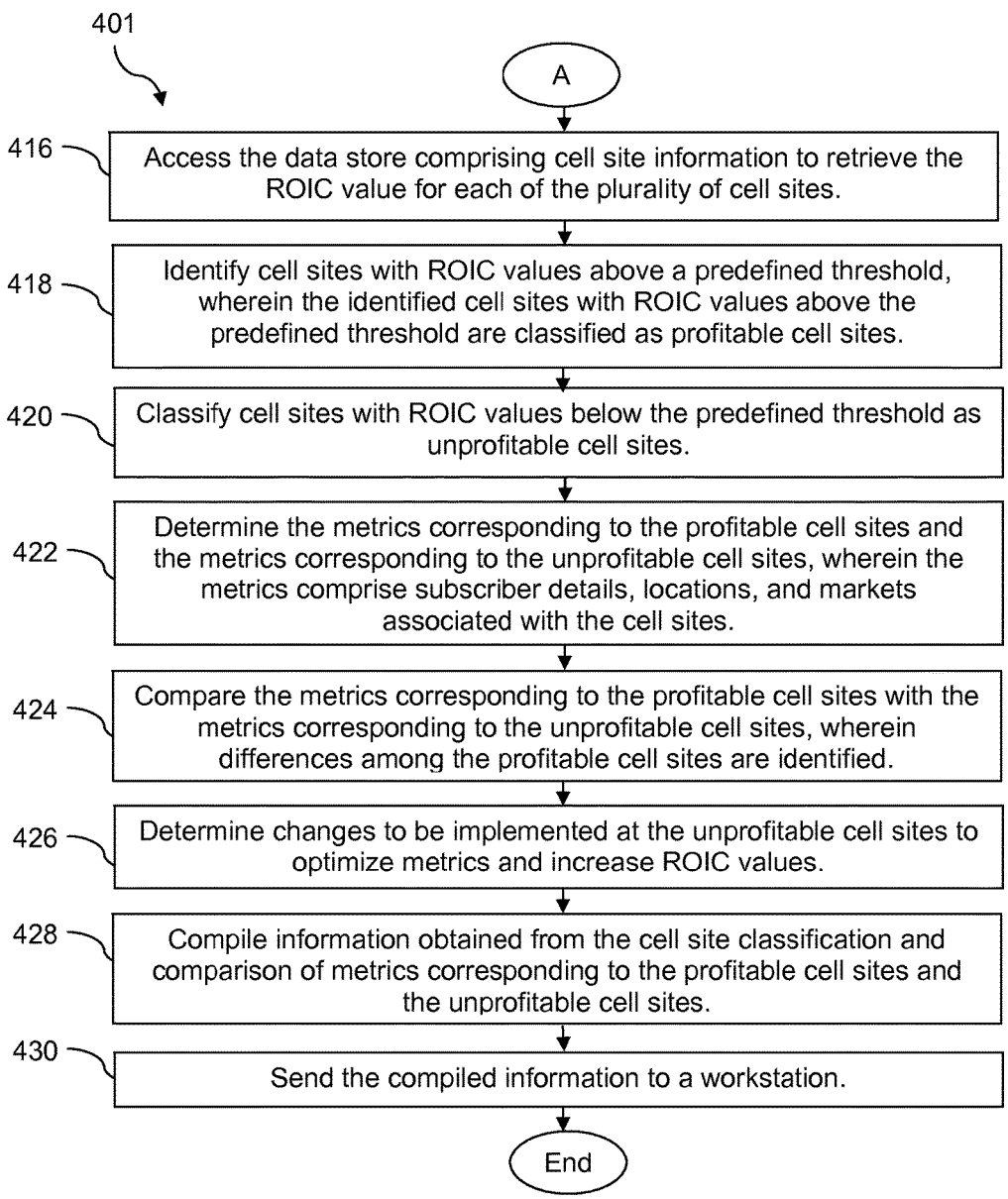

Referring now to FIG. 5A and FIG. 5B, a method 401 is described. At block 402, a server for cell site economics may read revenue data and usage data from a data store, wherein the usage data comprises data about cell site usage of each of a plurality of wireless communication service subscribers, and wherein the revenue data comprises data about revenue obtained by a wireless communication service provider from each of the wireless communication service subscribers. In an embodiment, the server 230 may read revenue data 219 and usage data 220 from the data store 218, wherein the revenue data 219 and the usage data 220 may comprise data for each of the plurality of subscribers 115. At block 404, the server may analyze the usage data for each subscriber to determine a set of cell sites used by the subscriber. In an embodiment, the server 230 may analyze the usage data 220 for each subscriber 115, wherein the set of most used cell sites is identified from among the plurality of cell sites 114 operated by the wireless communication service provider. At block 406, the server may associate a portion of the revenue data for each subscriber to the set of cell sites used by that subscriber. In an embodiment, the server 230 may associate a portion of the revenue data 219 for each subscriber 115 to the set of cell sites used by that subscriber 115.

At block 408, the server may read expense data for each of the plurality of cell sites from a data store, wherein the expense data represents the expense of operating the cell site. In an embodiment, the server 230 may read the expense data 224 for each of the plurality of cell sites 114 from the data store 221, wherein the expense data 224 represents the expense of operating the cell site 114. In an embodiment, as discussed further above, expenses such as sales costs and marketing costs that are not directly associated with specific cell sites may also be assigned to the cell sites. At block 410, the server may read capital cost data for each of the plurality of cell sites from a data store, wherein the capital cost data represents the capital cost associated with the cell site. In an embodiment, the server 230 may read the capital cost data 227 for each of the plurality of cell sites 114 from the data store 226, wherein the capital cost data 227 represents the capital cost associated with the cell site 114 as well as capital not directly associated with the cell site.

At block 412, the server may determine a return on invested capital (ROIC), EBITDA, NOPAT, or another profitability metric that may be calculated from an income statement, for each of the plurality of cell sites based on the portion of revenue data of each subscriber associated to the cell site, based on the expense data associated to the cell site, and based on the capital cost data associated to the cell site. In an embodiment, the server 230 may determine a ROIC value for each of the plurality of cell sites 114 based on the portion of revenue data 219 of each subscriber 115 associated to the cell site 114, based on the expense data 224 associated to the cell site 114, and based on the capital cost data 227 associated to the cell site 114.

At block 414, the server may store the ROIC value for each cell site in a data store comprising cell site information, wherein the data store comprising cell site information is accessible to users associated with a plurality of workstations. In an embodiment, the server 230 may store the ROIC value for each cell site 114 in the data store 228 comprising cell site information 229, wherein the data store 228 comprising the cell site information 229 is accessible to users associated with the plurality of workstations 212. At block 416, the server may access the data store comprising cell site information to retrieve the ROIC value for each of the plurality of cell sites. In an embodiment, the server 230 may access the data store 228 comprising cell site information 229 to retrieve the ROIC value for each of the plurality of cell sites 114. At block 418, the server may identify cell sites with ROIC values above a predefined threshold, wherein the identified cell sites with ROIC values above the predefined threshold are classified as profitable cell sites, and at block 420, the server may classify cell sites with ROIC values below the predefined threshold as unprofitable cell sites. In an embodiment, the server 230 may identify cell sites 114 with ROIC values above a predefined threshold and classify cell sites 114 with ROIC values above the predefined threshold and below the predefined threshold as profitable cell sites 114 and unprofitable cell sites 114, respectively.

At block 422, the server may determine the metrics corresponding to the profitable cell sites and the metrics corresponding to the unprofitable cell sites, wherein the metrics comprise subscriber details, locations, and markets associated with the cell sites. In an embodiment, financial information that is captured on a balance sheet or income statement may be captured by the system and dimensioned on a per cell site basis. Additionally, network operational data and capacity data that is captured is also stored on a per cell site basis. Storing and/or capturing data in such a de-averaged, per cell site basis provides a powerful tool for analyzing the economics of individual cell sites, promoting discovery of previously unknown and/or unexpected cause and effect relationships. This enhanced understanding of cause and effect may promote more effective management of cell sites and/or expenditure on cell sites and/or new cell sites. At block 424, the server may compare the metrics corresponding to the profitable cell sites with the metrics corresponding to the unprofitable cell sites, wherein differences among the profitable cell sites are identified.

In an embodiment, the server 230 may determine and compare the metrics corresponding to the profitable cell sites 114 and the metrics corresponding to the unprofitable cell sites 114 and identify the differences among the profitable cell sites 114. At block 426, the server may determine changes to be implemented at the unprofitable cell sites to optimize metrics and increase ROIC values. In an embodiment, the server 230 may determine changes to be implemented in order to enhance network performance and generate more revenue at the unprofitable cell sites 114. At block 428, the server may compile information obtained from the cell site classification and comparison of metrics corresponding to the profitable cell sites and the unprofitable cell sites, and at block 430, the server may send the compiled information to a workstation. In an embodiment, the server 230 may compile the information corresponding to the profitable cell sites 114 and the unprofitable cell sites 114 and send the compiled information to one of the plurality of workstations 212.

Figure 6:
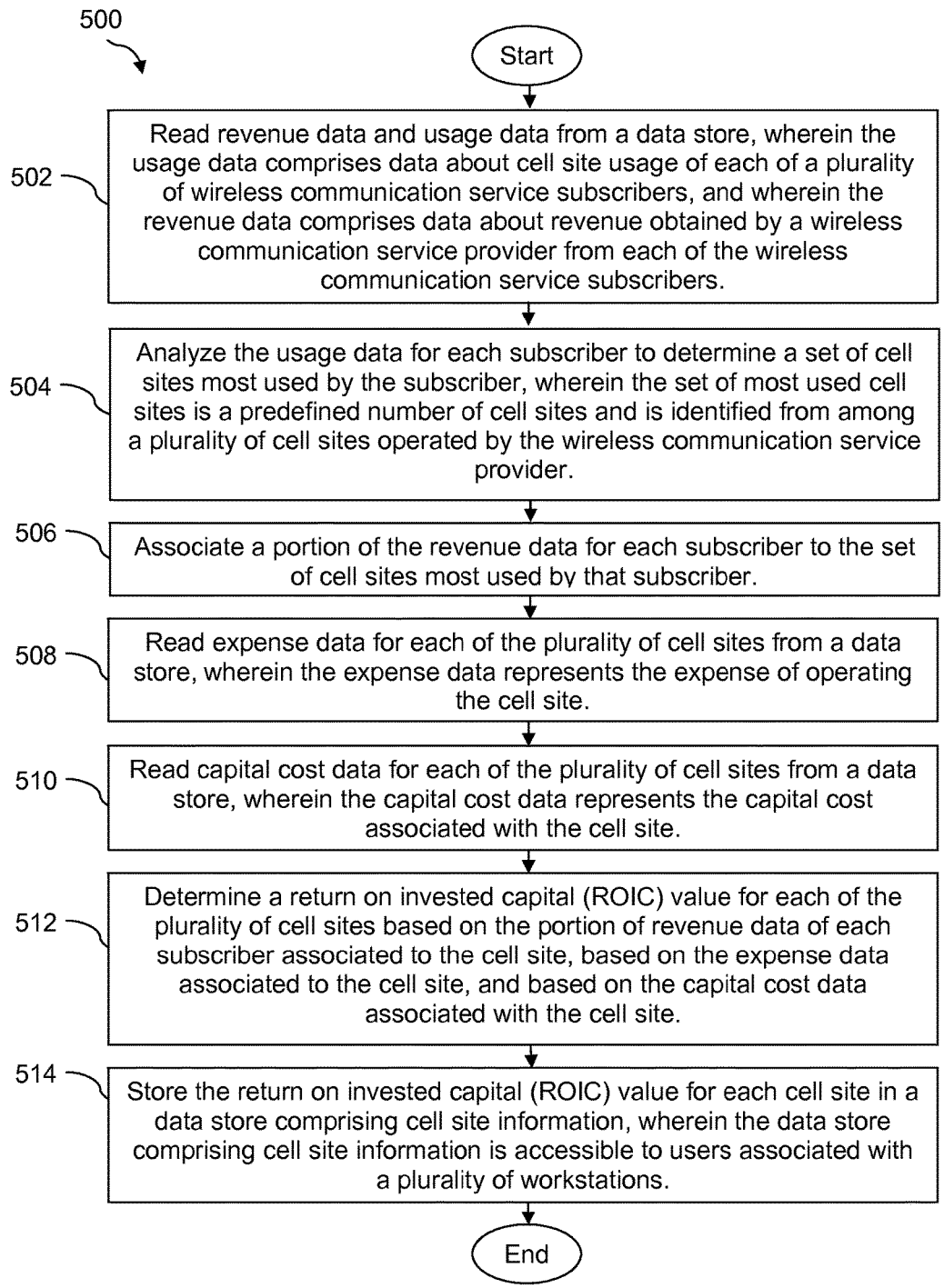
FIG. 6 is a flow chart illustrating another method according to an embodiment of the disclosure.

Referring now to FIG. 6, a method 500 is described. At block 502, a server for tracking cell site economics may read revenue data and usage data from a data store, wherein the usage data comprises data about cell site usage of each of a plurality of wireless communication service subscribers, and wherein the revenue data comprises data about revenue obtained by a wireless communication service provider from each of the wireless communication service subscribers. In an embodiment, the server 230 may read revenue data 219 and usage data 220 from the data store 218, wherein the revenue data 219 and the usage data 220 may comprise data for each of the plurality of subscribers 115.

At block 504, the server may analyze the usage data for each subscriber to determine a set of cell sites used by the subscriber. In an embodiment, the server 230 may analyze the usage data 220 for each subscriber 115. At block 506, the server may associate a portion of the revenue data for each subscriber to the set of cell sites most used by that subscriber. In an embodiment, the server 230 may associate a portion of the revenue data 219 for each subscriber 115 to the set of cell sites used by that subscriber 115. At block 508, the server may read expense data for each of the plurality of cell sites from a data store, wherein the expense data represents the expense of operating the cell site. In an embodiment, the server 230 may read the expense data 224 for each of the plurality of cell sites 114 from the data store 221, wherein the expense data 224 represents the expense of operating the cell site 114. At block 510, the server may read capital cost data for each of the plurality of cell sites from a data store, wherein the capital cost data represents the capital cost associated with the cell site. In an embodiment, the server 230 may read the capital cost data 227 for each of the plurality of cell sites 114 from the data store 226, wherein the capital cost data 227 represents the capital cost associated with the cell site 114.

At block 512, the server may determine a return on invested capital (ROIC) for each of the plurality of cell sites based on the portion of revenue data of each subscriber associated to the cell site, based on the expense data associated to the cell site, and based on the capital cost data associated to the cell site. In an embodiment, the server 230 may determine a ROIC value for each of the plurality of cell sites 114 based on the portion of revenue data 219 of each subscriber 115 associated to the cell site 114, based on the expense data 224 associated to the cell site 114, and based on the capital cost data 227 associated to the cell site 114. At block 514, the server may store the ROIC value for each cell site in a data store comprising cell site information, wherein the data store comprising cell site information is accessible to users associated with a plurality of workstations. In an embodiment, the server 230 may store the ROIC value for each cell site 114 in the data store 228 comprising cell site information 229, wherein the data store 228 comprising the cell site information 229 is accessible to users associated with the plurality of workstations 212.

Figure 7:
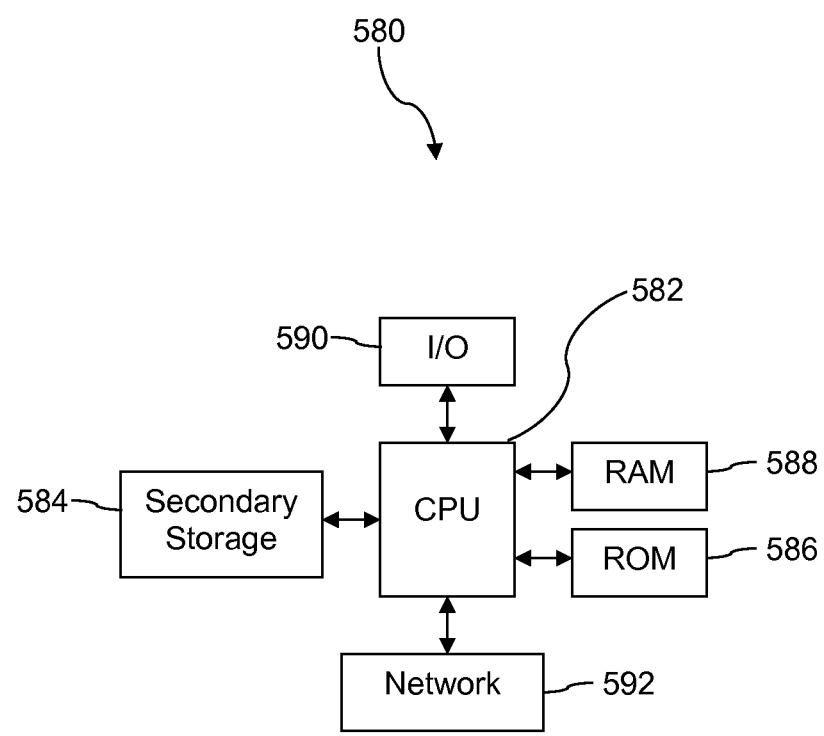
FIG. 7 illustrates an exemplary computer system suitable for implementing some aspects of the several embodiments of the disclosure.

FIG. 7 illustrates an embodiment of a computer system or server 580, which may be suitable for implementing one or more embodiments of the components disclosed herein, such as the server 230. The computer system 580 includes a processor 582 (which may be referred to as a central processor unit or CPU) that is in communication with memory devices including secondary storage 584, read only memory (ROM) 586, random access memory (RAM) 588, input/output (I/O) devices 590, and network connectivity devices 592. The processor 582 may be implemented as one or more CPU chips.

It is understood that by programming and/or loading executable instructions onto the computer system 580, at least one of the CPU 582, the RAM 588, and the ROM 586 are changed, transforming the computer system 580 in part into a particular machine or apparatus, such as a server 230 comprising an application 234, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 584 is typically comprised of one or more disk drives or tape drives and is used for non-volatile storage of data and as an over-flow data storage device if RAM 588 is not large enough to hold all working data. Secondary storage 584 may be used to store programs which are loaded into RAM 588 when such programs are selected for execution. The ROM 586 is used to store instructions and perhaps data which are read during program execution. ROM 586 is a non-volatile memory device which typically has a small memory capacity relative to the larger memory capacity of secondary storage 584. The RAM 588 is used to store volatile data and perhaps to store instructions. Access to both ROM 586 and RAM 588 is typically faster than to secondary storage 584. The secondary storage 584, the RAM 588, and/or the ROM 586 may be referred to in some contexts as computer readable storage media and/or non-transitory computer readable media.

I/O devices 590 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 592 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (Wi-MAX), and/or other air interface protocol radio transceiver cards, and other well-known network devices. These network connectivity devices 592 may enable the processor 582 to communicate with the Internet or one or more intranets. With such a network connection, it is contemplated that the processor 582 might receive information from the network, or might output information to the network in the course of performing the above-described method steps. Such information, which is often represented as a sequence of instructions to be executed using processor 582, may be received from and outputted to the network, for example, in the form of a computer data signal embodied in a carrier wave.

Such information, which may include data or instructions to be executed using processor 582 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 582 executes instructions, codes, computer programs, scripts which it accesses from hard disk, floppy disk, optical disk (these various disk based systems may all be considered secondary storage 584), ROM 586, RAM 588, or the network connectivity devices 592. While only one processor 582 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 584, for example, hard drives, floppy disks, optical disks, and/or other device, the ROM 586, and/or the RAM 588 may be referred to in some contexts as non-transitory instructions and/or non-transitory information.

In an embodiment, the computer system 580 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 580 to provide the functionality of a number of servers that is not directly bound to the number of computers in the computer system 580. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 580, at least portions of the contents of the computer program product to the secondary storage 584, to the ROM 586, to the RAM 588, and/or to other non-volatile memory and volatile memory of the computer system 580. The processor 582 may process the executable instructions and/or data structures in part by directly accessing the computer program product, for example by reading from a CD-ROM disk inserted into a disk drive peripheral of the computer system 580. Alternatively, the processor 582 may process the executable instructions and/or data structures by remotely accessing the computer program product, for example by downloading the executable instructions and/or data structures from a remote server through the network connectivity devices 592. The computer program product may comprise instructions that promote the loading and/or copying of data, data structures, files, and/or executable instructions to the secondary storage 584, to the ROM 586, to the RAM 588, and/or to other non-volatile memory and volatile memory of the computer system 580.

In some contexts, the secondary storage 584, the ROM 586, and the RAM 588 may be referred to as a non-transitory computer readable medium or a computer readable storage media. A dynamic RAM embodiment of the RAM 588, likewise, may be referred to as a non-transitory computer readable medium in that while the dynamic RAM receives electrical power and is operated in accordance with its design, for example during a period of time during which the computer 580 is turned on and operational, the dynamic RAM stores information that is written to it. Similarly, the processor 582 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A server for managing cell site performance, comprising:
    a processor;
    a non-transitory memory; and
    an application stored in the non-transitory memory, that when executed by the processor,
        reads revenue data and usage data from call detail records in a data store, wherein the usage data comprises data about cell site usage of each of a plurality of wireless communication service subscribers, and wherein the revenue data comprises data about revenue obtained by a wireless communication service provider from each of the wireless communication service subscribers associated with at least one mobile device,
        analyzes the usage data for each mobile device associated with a subscriber to determine a set of cell sites used by each mobile device associated with the subscriber, wherein the set of used cell sites is identified from among a plurality of cell sites operated by the wireless communication service provider,
        based on the analysis of usage data and the determination of the set of cell sites used by each mobile device, determines that a mobile device uses cell sites in a different location from cell sites corresponding to a number plan area code and a central office code for the mobile device,
        associates a portion of the revenue data for each mobile device to the set of cell sites used by that mobile device irrespective of the number plan area code and the central office code associated with the mobile device,
        reads expense data for each of the plurality of cell sites from a data store, wherein the expense data represents the expense of operating the cell site,
        reads capital cost data for each of the plurality of cell sites from a data store, wherein the capital cost data represents the capital cost associated with the cell site, generates an income statement and partial balance sheet for each of the plurality of cell sites based on the expense data and the capital cost data, determines a profitability metric value for each of the plurality of cell cites based on the income statement and the partial balance sheet for each of the plurality of cell sites, stores the profitability metric value for each cell site in a data store comprising cell site information, wherein the data store comprising cell site information is accessible to users associated with a plurality of workstations, compares the profitability metric value of a selected cell site to the profitability metric value of a selection of other cell sites, and based on the comparison, provides a recommendation to one of perform a technology upgrade on the selected cell site, perform an adjustment procedure on the selected cell site, or build a new cell site proximate to the selected cell site.

2. The server of claim 1, wherein the portion of the revenue data for each subscriber associated to the set of cell sites is based in part on a yield generated by each subscriber, wherein yield is defined as the dollar amount of revenue divided by the megabytes (MB) of usage.

3. The server of claim 1, wherein the expense data comprises expenses associated with at least three of operation, backhaul infrastructure, utilities, access, service, roaming, sales, and marketing of the cell site.

4. The server of claim 1, wherein the capital cost comprises at least one of spectrum, property, plant, and equipment costs of the cell site.

5. The server of claim 1, wherein the data store comprising revenue data and usage data is accessible through a business information server.

6. The server of claim 1, wherein revenue data, usage data, expense data, and capital cost data is updated after each billing cycle, wherein the billing cycle is a predefined period of time determined by the wireless communication service provider.

7. The server of claim 1, wherein the profitability metric value is a return on invested capital (ROIC) value that is defined as the value of net operating profit after taxes divided by the value of net invested capital.

8. A method of assessing metrics associated with cell sites to manage cell site performance, comprising:

reading, by a server communicatively coupled to a network, revenue data and usage data from call detail records in a data store, wherein the usage data comprises data about cell site usage of each of a plurality of wireless communication service subscribers, and wherein the revenue data comprises data about revenue obtained by a wireless communication service provider from each of the wireless communication service subscribers;

analyzing, by the server, the usage data for each mobile device associated with a subscriber to determine a set of cell sites used by each mobile device associated with the subscriber, wherein the set of used cell sites is identified from among a plurality of cell sites operated by the wireless communication service provider;

based on the analysis of usage data and the determination of the set of cell sites used by each mobile device, determining, by the server, that a mobile device uses cell sites in a different location from cell sites corresponding to a number plan area code and a central office code for the mobile device;

associating, by the server, a portion of the revenue data for each mobile device to the set of cell sites used by that mobile device irrespective of the number plan area code and the central office code associated with the mobile device;

reading, by the server, expense data for each of the plurality of cell sites from a data store, wherein the expense data comprises the expense of operating the cell site;

reading, by the server, capital cost data for each of the plurality of cell sites from a data store, wherein the capital cost data represents the capital cost associated with the cell site;

determining, by the server, a return on invested capital (ROIC) value for each of the plurality of cell sites based on the portion of revenue data of each subscriber associated to the cell site, based on the expense data associated to the cell site, and based on the capital cost data associated to the cell site;

storing, by the server, the return on invested capital (ROIC) value for each cell site in a data store comprising cell site information, wherein the data store comprising cell site information is accessible to users associated with a plurality of workstations;

accessing, by the server, the data store comprising cell site information to retrieve the ROIC value for each of the plurality of cell sites;

identifying, by the server, cell sites with ROIC values above a predefined threshold, wherein the identified cell sites with ROIC values above the predefined threshold are classified as profitable cell sites;

classifying, by the server, cell sites with ROIC values below the predefined threshold as unprofitable cell sites;

determining, by the server, the metrics corresponding to the profitable cell sites and the metrics corresponding to the unprofitable cell sites, wherein the metrics comprise subscriber details, locations, and markets associated with the cell sites;

comparing, by the server, the metrics corresponding to the profitable cell sites with the metrics corresponding to the unprofitable cell sites, wherein differences among the cell sites are identified;

determining, by the server, changes to be implemented at the unprofitable cell sites to optimize metrics and increase ROIC values based on the differences among the cell sites;

compiling, by the server, information obtained from the cell site classification and comparison of metrics corresponding to the profitable cell sites and the unprofitable cell sites, wherein the compiled information is represented as one of a coverage map, histogram, graph, or pie chart illustrating profitable cell sites and unprofitable cell sites, along with corresponding metrics;

sending, by the server via a network, the compiled information to a workstation; and recommending, by the server to the workstation via the network, changes to be implemented at the unprofitable cell sites based on the compiled information.

9. The method of claim 8, wherein the plurality of cell sites comprise connector sites alongside highways, wherein the connector sites link market areas of a cellular network together.

10. The method of claim 8, wherein the plurality of cell sites are located in different geographic locations comprising suburban, urban, rural, and remote areas.

11. The method of claim 8, wherein subscriber details further comprise types of mobile devices, cell phone plans, and subscription accounts employed by the plurality of subscribers in the cellular network.

12. The method of claim 8, wherein the expense data for each of the plurality of cell sites further comprises sales expenses and marketing expenses allocated to the cell sites.

13. The method of claim 8, wherein the changes to be implemented at the unprofitable cell sites comprise investing in marketing and advertising, updating equipment, increasing bandwidth, and improving network performance.

14. The method of claim 8, further comprising determining changes to be implemented in building new cell sites to optimize metrics and increase ROIC values.

15. A method of managing cell site performance based on evaluating subscriber usage of cell sites in various markets, comprising:

reading, by a server communicatively coupled to a network, revenue data and usage data from a data store, wherein the usage data comprises data about cell site usage of each of a plurality of wireless communication service subscribers, and wherein the revenue data comprises:

data about revenue obtained by a wireless communication service provider from each of the wireless communication service subscribers, and data about service revenue that is non-specific to any cell sites, wherein the service revenue is prorated across a plurality of cell sites;

analyzing, by the server, the usage data for each mobile device associated with a subscriber to determine a set of cell sites used by each of mobile device associated with the subscriber, wherein the set of used cell sites is identified from among a plurality of cell sites operated by the wireless communication service provider;

based on the analysis of usage data and the determination of the set of cell sites used by each mobile device, determining, by the server, that a mobile device uses cell sites in a different location from cell sites corresponding to a number plan area code and a central office code for the mobile device;

associating, by the server, a portion of the revenue data for each mobile device to the set of cell sites used by that mobile device irrespective of the number plan area code and central office code associated with the mobile device;

reading, by the server, expense data for each of the plurality of cell sites from a data store, wherein the expense data represents the expense of operating the cell site;

reading, by the server, capital cost data for each of the plurality of cell sites from a data store, wherein the capital cost data represents the capital cost associated with the cell site;

determining, by the server, a return on invested capital (ROIC) value for each of the plurality of cell sites based on the portion of revenue data of each subscriber associated to the cell site, based on the expense data associated to the cell site, and based on the capital cost data associated to the cell site;

storing, by the server, the return on invested capital (ROIC) value for each cell site in a data store comprising cell site information, wherein the data store comprising cell site information is accessible to users associated with a plurality of workstations; and recommending, by the server to a communicatively coupled work station computer system, to one of perform a technology upgrade on a selected cell site, perform an adjustment procedure on the selected cell site, or build a new cell site proximate to the selected cell site based on the return on invested capital of the selected cell site.

16. The method of claim 15, wherein the revenue data comprises revenue generated from voice calls and data usage from each of the wireless communication service subscribers.

17. The method of claim 15, wherein the usage data further comprises information related to minutes of usage for voice calls and megabytes of usage for data from each of the wireless communication service subscribers.

18. The method of claim 15, wherein the usage data and revenue data are monthly data, and wherein return on invested capital that is determined is a monthly return on invested capital metric.

* * * * *